United States Patent [19]

Charransol et al.

[11] 3,865,989

[45] Feb. 11, 1975

[54] SWITCHING MODULE FOR A PCM SWITCHING SYSTEM

[75] Inventors: Pierre Charransol; Jacques Hauri; Claude Athenes, all of Paris, France

[73] Assignee: International Standard Electric Corporation, New York, N.Y.

[22] Filed: Nov. 20, 1972

[21] Appl. No.: 308,295

[52] U.S. Cl. ........... 179/15 AQ, 307/221 R, 328/37

[51] Int. Cl. ........... H04j 3/02

[58] Field of Search ........ 179/15 AQ, 15 AT, 15 A, 179/15 BV, 15 BA, 18 J; 340/172.5; 328/37; 307/221 R, 221 C

[56] References Cited

UNITED STATES PATENTS

| | | | |
|---|---|---|---|
| 3,251,945 | 5/1966 | Schlichte | 179/15 AT |
| 3,371,221 | 2/1968 | Onuma | 307/221 R |
| 3,458,658 | 7/1969 | Aro | 179/18 J |
| 3,458,659 | 7/1969 | Sternung | 179/18 J |
| 3,551,692 | 12/1970 | Yen | 307/221 C |
| 3,586,875 | 6/1971 | Nicklas | 307/221 C |
| 3,639,693 | 2/1972 | Bartlett | 179/15 AT |
| 3,646,277 | 2/1972 | Gueldenpfennig | 179/18 J |
| 3,694,580 | 9/1972 | Inose | 179/15 AT |
| 3,761,637 | 9/1973 | Henrion | 179/15 A |
| 3,784,751 | 1/1974 | Arndt | 179/15 AT |

*Primary Examiner*—Kathleen H. Claffy
*Assistant Examiner*—Thomas D'Amico
*Attorney, Agent, or Firm*—Delbert P. Warner; James B. Raden

[57] ABSTRACT

An electronic switching module is provided for a switching system handling signals which have been subjected to Pulse Code Modulation. The module provides a path through two space switching stages to interconnect an incoming channel and an outgoing channel. A first one of the switching stages responds to an address information signal fed through a receiver register and a buffer register to connect a selected input to a second switching stage. The second switching stage responds to an enable signal to complete a connection through to the selected output line.

1 Claim, 7 Drawing Figures

FIG.5. TIME AND DATA SIGNALS
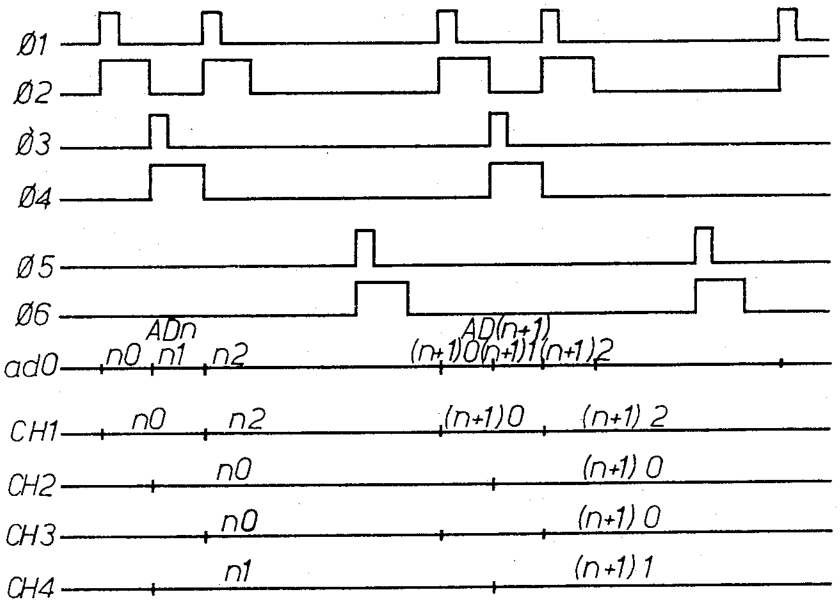
SHIFT REGISTER STAGE FIG.6. FIG.7. REGISTERS
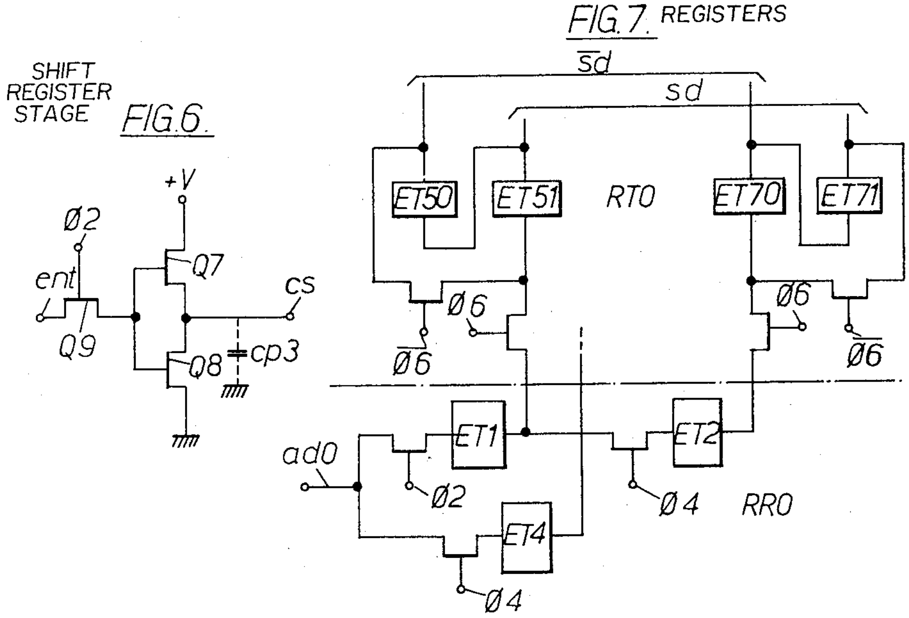

SWITCHING MODULE FOR A PCM SWITCHING SYSTEM

BACKGROUND OF THE INVENTION

1. Field of The Invention

The present invention relates to an electronic switching module for use in telephone exchanges. It relates particularly to the application of time division switching techniques to signals which have been subjected to pulse code modulation (PCM).

2. Description of the Prior Art

At the input of a typical electronic exchange for switching PCM signals, the signals arriving from busy lines — that is from lines being used for issuing calls or whereon a conversation is in process — are sampled at 8 kHz and every sample is translated into a coded combination of 8 binary signals or bits.

Each combination is transmitted in parallel over 8 conductors, within a very short time slot constituting a time channel. It is thus possible to distribute a number of channels in time, e.g., 256 channels. The period of recurrence of the successive combinations of a channel is 125 $\mu$s, whereas the time slots assigned to each channel have a duration of about 500 ns. An incoming multiplex group handles the signals arriving from 256 lines. A similar outgoing multiplex group handles the signals intended to these same 256 lines. The just cited numerical values, while not absolutely necessary, are nevertheless currently used.

Inside the exchange there will generally be several incoming and several outgoing multiplex groups. It is essential that any coded combination appearing on a time channel of a multiplex group can be retransmitted over any time channel of any multiplex group. This involves space switching (inter-group connections) as well as time switching (inter-channel connections) operations. These will be performed by means of a network including memories and space switches. This network may for instance be of the well-known space-time-space type. A path between an incoming channel of a first line (A) and an outgoing channel of a second line (B) passes through two space switches which are located, in a way, on each side of a memory cell; these switches provide the memory cell with an access to the incoming multiplex groups and to the outgoing multiplex groups, respectively. This way, at the time proper to the incoming channel, and through the first switch connected into the appropriate incoming group, a coded combination received over the incoming channel is registered into the memory cell. At the time proper to the outgoing channel, and through the second switch connected onto the appropriate outgoing group, the coded combination received over the incoming channel and kept in the memory cell is retransmitted over the outgoing channel. Connection in the reverse direction, between the outgoing channel of the first line (A) and the incoming channel of the second line (B) is achieved the same way, generally through the same memory cell and the same space switches.

In practice, the numerous memory cells required belong to several communication memories and are each associated with two space switches. In a memory, every cell must be reached at least twice during a cycle of 125 $\mu$s, i.e., first at the time proper to the incoming channel and, second, at the time proper to the outgoing channel, each of the two switches being conveniently operated at these given instants. The other cells of the same memory enable establishing other communications provided they are each related to different time channels. Communications between incoming and outgoing homologous time channels are processed by specially provided means.

The space switches used in such an application are necessarily of the electronic type, since a connection is asked for every 500 ns approximately. Obviously, it is desirable that these switches should also be compact, permitting a higher operational speed, that they should have small thermal dissipation, permitting greater compactness, and, naturally, that their price be as low as possible.

In view of the foregoing, the present invention makes use of integrated circuits employing field effect components. Multiplexers of this type are known, effectively having 16 inputs and one output. One of the 16 inputs, designated by a 4-bit coded combination, can be connected to the single output in a very short lapse of time. Multiplexers with one input and 16 outputs are also known. Although such a solution is not without interest, it is not perfectly well adapted to meet the requirements of the switching centers. One may criticize in particular the fact that two types of circuits (multiplexers and demultiplexers) must be used for the input and output space switches. Moreover, the number of connections (16 inputs, 1 output, 4 inputs for the coded identity of the exchange input, not counting the power supply connections) is fairly high as compared to the switching functions performed by a circuit, and will require a lot of wiring. The use of a multiplexer or a demultiplexer with less than 16 terminals cannot be considered because the cost per switching point would then be uselessly increased.

SUMMARY OF THE INVENTION

It appears clearly from the foregoing that an electronic switching module, preferably realized by components in the form of field effect integrated circuits, will enable realization of the desired characteristics of operating speed, compactness, small power consumption and comparatively low cost. This invention relates to a module of this type having a structure which is particularly well-adapted to the requirements of telephone switching systems and, more generally, to those of any digital signal switching system.

A primary purpose of the present invention is to provide a switching module designed to be embodied in the form of an integrated circuit and characterized by the fact that it includes, in particular, $m$ outputs, $n$ inputs and $m \times n$ switching circuits for the connection of any input to any output. With every output of the module there is associated an address conductor, a receiving register — designed to receive a multi-bit coded address embodying an input identity —, a buffer register associated with the receiving register to collect an address received by said receiving register and to keep it while allowing the receiving register to become available for the reception of a subsequent address, and, finally, circuits decoding the address contained in the buffer register and causing the switching circuit to conduct which connects the designated input to the output under consideration.

This switching module is moreover characterized by the fact that, with every output, there has also been provided an enable conductor and an enable circuit which provide the condition for the selected input to be connected through to the considered output.

These arrangements enable the realization of a module with a comparatively large number of crosspoint switching circuits, while maintaining the number of input/output conductors within reasonable limits. Moreover, in order to realize a large size switch, and owing to the enable circuit, it is possible to associate several modules by interconnection of either their inputs or their outputs, since the module in which a desired connection will take place can be chosen by means of an enable signal.

BRIEF DESCRIPTION OF THE DRAWINGS

Different other objects and features of the invention will become more apparent from the following detailed description, given as a non-limiting example, with reference to the accompanying drawings, in which:

FIG. 5 represents relationships between time signals and data signals of use in explaining how the various elements of the registers of FIG. 4 operate;

FIG. 6 is the theoretical diagram of a shift register stage different from that shown in FIG. 2, but performing the same function.

FIG. 7 is the circuit diagram of an alternative embodiment of the registers RRO and RTO shown in FIG. 1.

DESCRIPTION OF PREFERRED EMBODIMENTS

Figure 1:
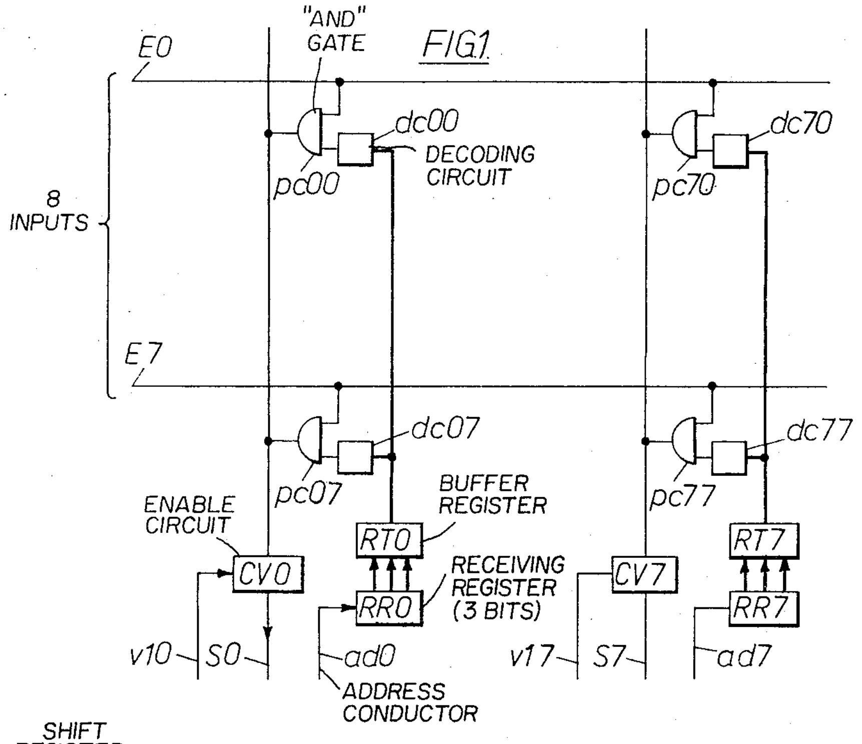
FIG. 1 is a diagrammatic representation of the circuits of a switching module according to the invention.

With reference to FIG. 1, there will be first described the diagram of the circuits of a switching module according to the present invention.

This switching module comprises 8 inputs E0 to E7, 8 outputs S0 to S7 and 64 switching circuits *pc* 00 to *pc* 77. For the sake of clarity, only the first and last inputs, the first and last outputs and the corresponding switching circuits have been represented.

Assuming that circuit *pc* 00, which may be a mere gate, is made to conduct, input E0 can be connected to output SO. If arrangements are made in order to have one selected gate to conduct among the gates associated with output S0, then any thus selected input E0 to E7 can be connected to said output S0. If the same is done in an independent manner for every output, then the module will enable the establishment of a connection between each output and any of the inputs.

Also associated with output S0, are an address conductor *ad* 0 provided for transmitting, in series, a three-bit address, which designates the input to which the output is connected, a receiving register RR0 which receives said three bits in series and then presents them in parallel form, a buffer register RT0 which receives the three bits supplied in parallel form by register RR0 and then keeps them so that register RR0 can be made available to receive a new address, as well as address decoding circuits *dc* 00 to *dc* 07 parallel-controlled by the output of register RT0, but individually associated with gates *pc* 00 to *pc* 07.

A three-bit address is transmitted in series over conductor *ad* 0. It is received by register RR0. Once completely received by register RR0, this address is transferred into register RT0. From that instant, the address is transmitted towards decoding circuits *dc* 00 to *dc* 07. One of these operates, e.g., decoding circuit *dc* 00, and supplies a signal which renders the associated gate *pc* 00 conducting. During that time register RR0 has been released and can now receive a new address.

The switch with 8 inputs and one output consisting of circuits RT0, *dc* 00 to *dc* 07 for the controlling functions, and *pc* 00 to *pc* 07 for the connecting function, can thus connect output S0 successively to different inputs, without any interruption in spite of the fact that the addresses are sent in series.

Similar means are associated with output S7, and with the outputs such as RR7, RT7, *dc* 70 to *dc* 77, in order to control gates *pc* 70 to *pc* 77.

Moreover, an enable conductor *v* 10 and an enable circuit CV0 are also associated with output S0. If a signal is present on the enable conductor *v* 10, then the enable circuit *cv*0 conducts so that output S0 can be connected to a selected input. If the signal is absent from conductor *v* 10, then circuit CV0 isolates output S0.

The other outputs are also provided with enable means, such as *v* 17 and CV 7 for output S7.

With such arrangements it is possible e.g., to form switches with 16 inputs and 8 outputs by connecting in parallel the outputs (S0 to S7) and the address conductors (*ad* 0 to *ad* 7) of two modules identical with the module in FIG. 1. Each module will enable connecting a common output such as S0 to a group of 8 inputs and, particularly, to a designated input within the group. Only one module will receive a signal over its wire *v* 10, so that the common output S0 will be connected to only one input at a time in the two 8-input groups.

A switch with 8 inputs and 16 outputs can likewise be formed by connecting in parallel the address conductors and the inputs of two modules.

In the module shown in FIG. 1, the gates such as *pc* 00 are mere coincidence gate circuits of the AND type. The decoding circuits may consist of simple AND gates or, again, of a collective conventional pyramid. The enable circuits such as CV0 are also made up of AND type circuits but, according to current practice, they may include a stage which gives the output signals of the module some standardized electrical features.

In the following, a detailed description will be made of only the mode of embodiment of the receiving and the buffer registers, such as RR0 and RT0 respectively, within the scope of a system making use of active components that employ the field effect.

Figure 2:
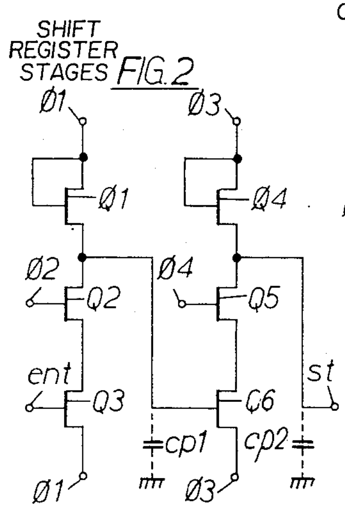
FIG. 2 is the theoretical diagram of a shift register stage with conventional field-effect transistors.

FIG. 2 shows the basic diagram of a conventional shift-register stage. This stage consists of two chains of three field-effect transistors each. The first chain is made up of transistors Q1, Q2, Q3 and the second one, of transistors Q4, Q5, Q6.

Figure 3:
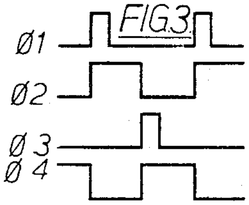
FIG. 3 shows graphs of the time signals required for operation of the circuits of FIG. 2.

An input *ent* is connected to the control electrode or gate of transistor Q3, and the common point of transistors Q1 and Q2 is connected to the gate of transistor Q6, whereas an output *st* is connected to the common point of transistors Q4 and Q5. There is shown at *cp* 1 the capacity of the linking conductor between the two chains, and of the control electrode of transistor Q6. Similarly, *cp*2 represents the capacity of the output conductor of the stage. The circuits are moreover fed with periodical signals $\phi1$, $\phi2$, $\phi3$, $\phi4$ which are shown by the curves in FIG. 3.

Transistors Q1, Q2, Q3 forming the first chain are assumed to be all off before they are supplied with the phase signals $\phi1$ and $\phi2$ and an information signal appears at input *ent*. When the time signal $\phi1$ appears, the potential at both ends of the chain rises at the same time. As a consequence, no current is caused to flow along the chain, but the potential transistor Q1 is made to conduct and capacity *cp* 1 is charged positively through said transistor Q1. The time signal $\phi2$ begins at the same time as time signal $\phi1$. It enables transistor Q2, but this remains without any effect as long as signal $\phi1$ lasts. Once the latter has come to an end, signal $\phi2$ tends to maintain transistor Q2 conductive while the upper electrode receives the positive voltage built up capacity *cp* 1. If input *ent* receives at the same time a positive information signal, and since the lower electrode of transistor Q3 is now at the lower potential, transistor Q3 also conducts during all the remaining time of impulse $\phi2$, so that capacity *cp* 1 discharges across transistors Q2 and Q3. On the other hand, if there is no information signal at input *ent*, transistor Q3 remains off, and capacity *cp* 1 remains charged.

In conclusion, after the end of the time impulse $\phi2$, the data signal which was present at input *ent* is found to have been transferred, although in an inverted manner, onto the terminals of capacity *cp* 1, i.e., onto the gate of transistor Q6.

Operation of the second chain of transistors under the effect of time signals $\phi3$ and $\phi4$ is exactly the same as has just been described. After the end of the time impulse $\phi4$, the data signal supplied by capacity *cp* 1 is found to have been transferred, although in an inverted manner, onto the terminals of capacity *cp* 2, i.e., onto the output *st* of the stage.

In short, after the four time signals $\phi1$, $\phi2$, $\phi3$, $\phi4$, the data signal which was present at input *ent* is found at output *st*, after having been submitted to two inversions which cancel each other.

There will now be described, with reference to FIG. 4, an example of an embodiment of the registers RR0 and RT0 according to FIG. 1. These registers consist of chains such as those just described in conjunction with FIG. 2.

Register RR0 comprises four chains CH1, CH2, CH3 and CH4, the chains designated by odd reference figures being supplied with time signals $\phi1$ and $\phi2$, whereas the chains designated by even reference figures are supplied with time signals $\phi3$ and $\phi4$. There is also found the address conductor *ad* 0 shown in FIG. 1.

The operating mode of register RR0 will be clearer from a consideration of the graphs representing signals in FIG. 5. In addition to time signals $\phi1$ to $\phi6$, FIG. 5 shows two groups of three-bit data signals which are transmitted over the address-conductor *ad*, 0, as well as the data which are registered in the course of time into the outputs of the various stages of register RR0.

There will be first considered the reception of the data bits *n*0, *n*1, *n*2 which form an address ADn. Signal *n*0 is transmitted in synchronism with a first pair of time signals $\phi1$ and $\phi2$. It is inverted and registered in chain CH1, i.e., more particularly, on the output capacity of this chain. Signal *n*1 is inverted and registered in chain CH4 while signal *n*0 steps once and is transferred to the output of chain CH2. Last, signal *n*2 is inverted and registered in chain CH1 while signal *n*0, after another inversion, gets to the output of chain CH3.

At the output of chains CH3, CH4 and CH1 there are now found the three address bits received. It will be noted that the three bits are inverted, the first one having been inverted only once.

Reception of a following address AD (*n*+1) takes place exactly the same way, as shown in FIG. 5.

Once address AD*n* has been received entirely, a dead time is allowed to lapse whose purpose will be indicated further. Then, the module receives time impulses $\phi5$ and $\phi6$.

Said time impulses $\phi5$ and $\phi6$ transfer the three bits supplied by chains CH1, CH4 and CH3 into the three chains CH5, CH6, CH7 which form register RT0. It has been seen previously that the bits registered in CH1, CH4, CH3 were inverted. The transfer into CH5, CH6, CH7 involves a new inversion which restores the original information.

The three address-bits thus restored are fed right away towards the decoding circuits, over conductors *sd*, in order to control the operation of a cross-point switching circuit as well as the association, provided this has been enabled, of output S0 with one of the inputs E0 to E7 (FIG. 1).

During the switching time of the above cited circuits, register RR0 — which is now available owing to the transfer of the information it contained into register RT0 — is used for receiving the address intended for the next connection. More precisely, the address AD (*n*+1) is received during the operating time of the decoding, switching and enabling circuits. The end of the reception of the address AD (*n*+1) corresponds to the completion of the effective connection between an input such as E0 and an output S0 (FIG. 1). The previously cited dead time is then encountered again. This dead time, during which the input-output connection is achieved in the module, permits a stable and noiseless transmission of the switched information onto the considered output.

The circuits just described, while being simple and of easy construction in the form of integrated circuits, meet the functional requirements defined relative to the module shown in FIG. 1.

In spite of the serial transmission of the address information, these circuits enable the switching points to operate at a high frequency, owing to a kind of interlacing technique, whereas a dead time can easily be provided for during which the module will supply a noiseless output information.

With reference to FIGS. 6 and 7, there will now be outlined an alternative embodiment of registers RR0 and RT0 which offers some advantages as compared with the preceding embodiment.

Figure 4:
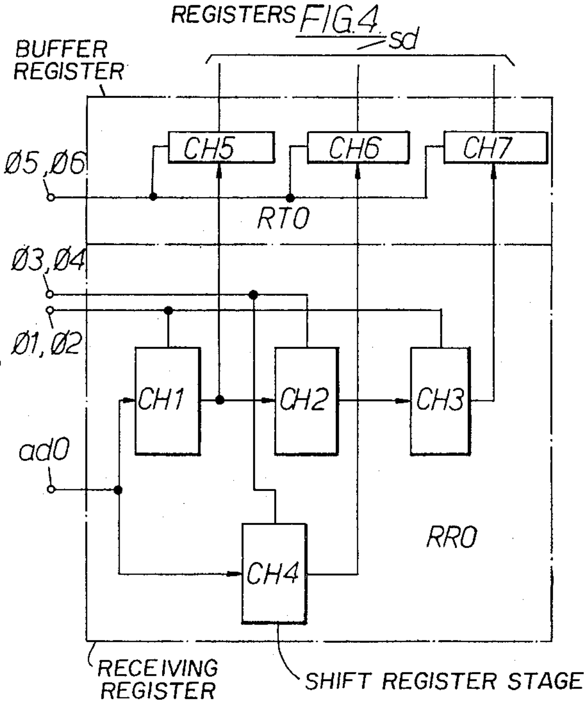
FIG. 4 is a block diagram of an embodiment of the registers RRO and RTO of the module according to FIG. 1.

FIG. 6 represents the basic circuit corresponding to a chain such as shown in FIGS. 2 and 4. This circuit also includes three transistors Q7, Q8 and Q9. It is controlled by a single time signal, $\phi2$ in the considered example. Transistors Q7 and Q8 are complementary transistors which are permanently supplied with current between a positive potential +V and the reference potential, i.e., the ground. When transistor Q9 is made to conduct by the phase signal $\phi2$, the gates of transistors Q7 and Q8 are linked and controlled by the data signal which is present at input *ent*. If the data signal is of a low level, transistor Q7 becomes conductive and charges capacity *cp* 3 which is associated with the output conductor *cs*, positively. When the data signal is positive, transistor Q8 operates and the capacity may be discharged. The input information is therefore found, although inverted, at the output of the circuit, exactly as in the first chain shown in FIG. 2.

Ths stage according to FIG. 6 offers the advantage that it can be controlled in a direct way, the AND gate formed by transistor Q9 being then omitted.

FIG. 7 represents an embodiment of registers RR0 and RT0, based on the use of a circuit according to FIG. 6. The chain of two transistors (Q7 and Q8 in FIG. 6) is represented in FIG. 7 by means of a rectangle, whereas the input transistor (Q9, in FIG. 6) is explicitly shown. One will immediately note that a same chain, e.g., ET51, can be controlled by two independent input circuits each provided with an input transistor of its own.

The various input transistors are controlled by phase signals which may be those of FIG. 5, the time signals $\overline{\phi\ 6}$ only being the logical inverses of signals $\phi$ 6.

In register RR0, chains ET1, ET2 and ET4 are arranged as their homologous chains in FIG. 4 and operate the same way. The first bit of an address is received by ET1 during the time duration of $\phi$ 2. The second bit is received by ET4, in the time duration of signal $\phi$4, while the first bit is transferred onto ET2. The third bit is received by ET1, in the second occurrence of signal $\phi$ 2. It is seen that there is no circuit corresponding to the chain CH3 according to FIG. 4. Consequently, the first bit has been inverted only twice and, at the output of chain ET2, it is found to be identical with the input bit, whereas the two others at the output of chains ET1 and ET4 are inverted.

During time signal $\phi$ 6, the last bit received from ET1 is transferred to a chain ET 51. The second inversion resulting from this transfer cancels the first one. This bit is consequently supplied to one of outputs *sd* just as it had been received. Moreover, this output drives in a direct way, that is without an additional gate, a gate ET 50. Gate ET 50 therefore supplies the bit complementary to the preceding one to one of the outputs $\overline{sd}$. Out of phase $\phi$ 6, i.e., during phase $\overline{\phi\ 6}$, said output $\overline{sd}$ is coupled to the input of chain ET 51.

Thus, a true flip-flop circuit is obtained which memorizes the address information and keeps it in a stable manner while also supplying its complement.

Registration of the second bit received from chain ET4 has not been represented in FIG. 7, but this is performed in the same way as just described in relation to the third bit. This holds true for the first bit too, except that, as shown in the figure, the output of circuit ET2 is connected to chain ET70, and not to a chain ET71 (on the analogy of ET51), which inverts the logical operation of the flip-flop in order to allow for the fact that the bit considered has already undergone two inversions instead of one.

It should be clearly understood that the above descriptions have been given only as non-limiting example and that other embodiments thereof may be considered without departing from the scope of the invention. The numerals, particularly, have been given only to enable a better understanding of the invention and can be chosen differently according to practical requirements.

We claim:

1. A switching module comprising m output terminals, n input terminals, m times n switching circuits enabling the connection of each of the m outputs to any one of the n inputs, an address conductor for each output, a receiving register coupled to receive over one of said address conductors a multi-bit coded address supplying the identity of an input, said multi-bit coded address being in the form of a series signal including at least three data bits, a buffer register coupled to the receiving register to receive an address from the receiving register and to store it while the receiving register becomes available for the reception of a subsequent address, said register including a first chain of transistors which receives and registers the first bit, a second chain of transistors which receives and registers the second bit and a third chain of transistors which receives and registers the first bit while the second bit is being received, said first bit being supplied to the third chain by the first chain which then finally becomes available for receiving and registering the third bit sent, said receiving register including a fourth chain of transistors which receives the first bit registered by said third chain while the third bit is being received, whereby every bit is passed through an odd number of chains, providing each bit with the correct polarity in parallel at a separate terminal of said buffer register, circuits coupled to the buffer register to decode the addresses in the buffer register and means coupling one of said switching circuits to receive the decoded adddresses and connect a selected input to a selected output, whereby the module has a comparatively large number of crosspoint switching circuits and operates at a comparatively high speed, while requiring a reasonable number of input/output conductors.

* * * * *